No. 754,419. PATENTED MAR. 15, 1904.
H. E. & M. L. BROWN.
CAR BRAKE.
APPLICATION FILED DEC. 9, 1903.
NO MODEL.
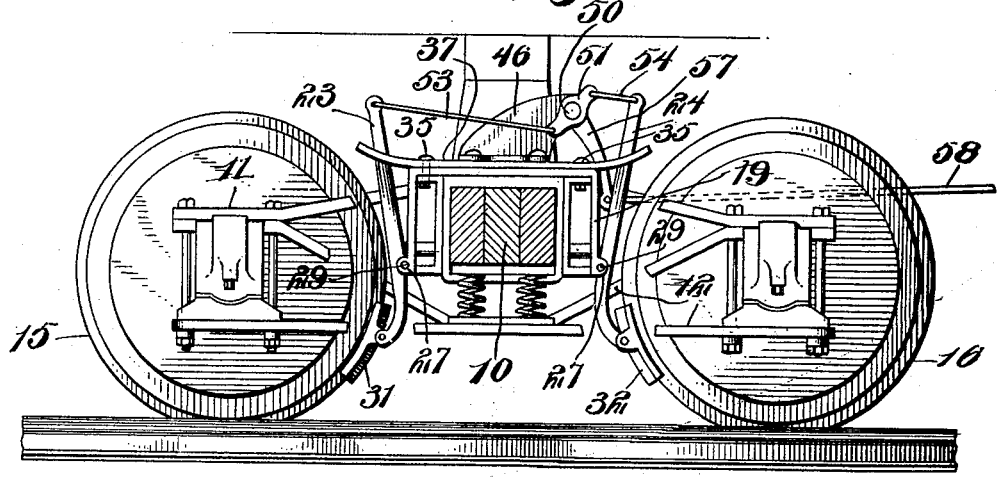
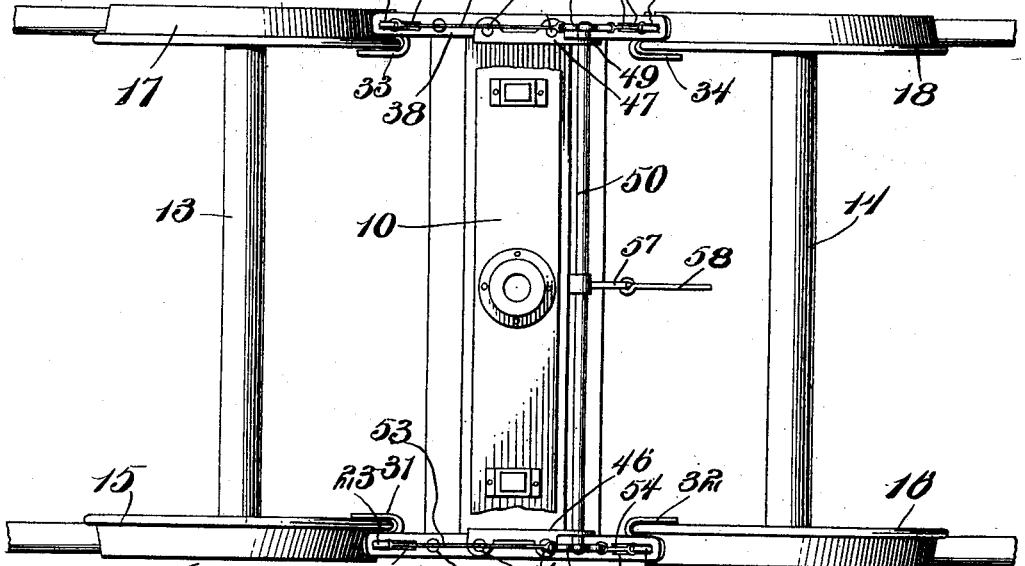
Herbert E. Brown and
Marcus L. Brown, Inventors.
Witnesses No. 754,419. Patented March 15, 1904.

UNITED STATES PATENT OFFICE.

HERBERT E. BROWN AND MARCUS L. BROWN, OF GOLDTHWAITE, TEXAS.

CAR-BRAKE.

SPECIFICATION forming part of Letters Patent No. 754,419, dated March 15, 1904.

Application filed December 9, 1903. Serial No. 184,494. (No model.)

*To all whom it may concern:*

Be it known that we, HERBERT E. BROWN and MARCUS L. BROWN, citizens of the United States, residing at Goldthwaite, in the county of Mills and State of Texas, have invented a new and useful Car-Brake, of which the following is a specification.

This invention relates to the brakes and brake-operating mechanism of railway-cars, and has for its object to simplify and improve devices and apparatus of this character and produce more effective results with a reduced expense of construction and without increase in the complication of the parts; and the invention consists in certain novel features of construction as hereinafter shown and described, and specified in the claims.

In the drawings illustrative of the invention in which corresponding parts are denoted by like designating characters, Figure 1 is a side elevation, partially in section, of a railway-car truck with the improvement applied; and Fig. 2 is a plan view of the same. Fig. 3 is a perspective view of parts of the improved structure detached.

The improved devices may be applied with slight and unimportant modifications to any of the car-trucks in common use, and I do not, therefore, wish to be limited in their use to any specific form or structure of truck-frame, but reserve the right to their use in connection with any form of truck to which they are adapted.

For the purpose of illustration the devices are shown applied to a conventional form of car-truck, in which 10 represents the central transverse member or bolster, 11 12 the side frames, 13 14 the axles mounted for rotation by the usual bearings in the side frames and carrying the track-wheels 15 16 17 18, as shown.

The improved devices include stirrup-bars 19 of inverted-U shape and disposed near the ends of the bolster between the track-wheels, rigidly riveted to the bolster, as shown. The depending ends of the stirrup-bars are formed with transverse eyes to which levers 23 24 25 26 are pivotally united, as by spaced ears 27 and pivot-pins 29, it being understood that each lever is provided with similar ears and pivot-pins and operating independently. Attached to the lower shorter ends of the levers are brake-shoes 31 32 33 34, the faces of the shoes conforming to both the treads and flanges of the track-wheels, as shown. Attached to the upper portions of the stirrup-bars, as by rivets 35 36, are guard-plates 37 38, extending beyond the bolster 10 and having elongated apertures 39 40 41 42 in the extended portions to provide guides for the upper ends of the levers 23 24 25 26, which extend through the apertures, as shown.

Attached, as by rivets 44 45, to the guard-plates 37 38 are brackets 46 47, having their upper ends extended laterally of the bolster 10 and terminating in bearings 48 49 for a shaft 50, which is thus mounted rotatively in the bearings. At the ends of the shaft 50 rocker-arms 51 52 are attached and connected by their free ends by rods 53 54 55 56, respectively, with the free upper ends of the levers 23, 24, 25, and 26, as shown.

Connected to the shaft 50 is an operating-arm 57, to which the ordinary brake-rod 58 is connected. The brake-rod will be operated by any of the ordinary means, such as the brake-shaft, operated by hand or the ordinary air-brake mechanism; but as these form no part of the present invention they are not illustrated, their construction and mode of operation being so well known. By this simple arrangement it will be obvious that when power is applied to the rod 58 the shaft 50 will be rotated with the result of simultaneously actuating all the levers 23, 24, 25, and 26 and applying the brake-shoes to all the track-wheels uniformly.

It will be noted that in this construction the transverse beams connecting the opposite shoes and levers are dispensed with and the lateral sway movement effectually prevented by the apertured guard-plates, which accomplish the same results as the beams and in a simpler and more effectual manner.

The means whereby the stirrup-bars, guard-plates, and brackets are united together and to the bolster 10 is also an important feature of the invention and adds materially to the value and efficiency of the invention.

The whole device is simple in construction, efficient in action, and will materially increase the safety by decreasing the number of parts usually employed in devices of this character and dispensing with the objectionable transverse brake-beams, which must be disposed relatively close to the rails.

With the improved devices herein described and shown the space below the bolsters is entirely unobstructed, and no danger exists, therefore, of the parts comprising the improvements striking obstructions between the rails.

Having thus described the invention, what we claim is—

1. The combination of a car-truck frame having track-wheels, guide-plates connected transversely of said truck-frame between said wheels and having longitudinal apertures through their ends, levers carrying brake-shoes for bearing against said track-wheels and fulcrumed upon said truck-frame and with their free ends extending through said apertures, and means carried by said truck-frame for simultaneously actuating said levers to apply said brake-shoes.

2. The combination of a car-truck frame having track-wheels, guide-plates connected transversely of said truck-frame between said wheels and having longitudinal apertures through their ends, levers carrying brake-shoes for bearing against said track-wheels and fulcrumed upon said truck-frame and with their free ends extending through said apertures, a shaft mounted for rotation upon said truck-frame and having rocker-arms upon its ends, connecting-rods between said rocker-arms and said levers, and means for rotating said shaft.

3. The combination of a car-truck frame having track-wheels, guide-plates connected transversely of said truck-frame between said wheels and having longitudinal apertures through their ends, levers carrying brake-shoes for bearing against said track-wheels and fulcrumed upon said truck-frame and with their free ends extending through said apertures, a shaft mounted for rotation upon said truck-frame and having rocker-arms upon its ends, connecting-rods between said rocker-arms and said levers, an arm extending from said shaft for the attachment of the brake-rod, and rods connecting said rocker-arms and levers.

4. The combination of a car-truck frame having spaced track-wheels mounted for rotation therein and with a central transverse member, stirrup-bars of inverted-U shape and embracing said central member between said wheels and having pivot-bearings in their depending ends, guide-plates riveted to the upper portions of said stirrup-bars and extending laterally from said central member and with longitudinal apertures in the extended portions, levers fulcrumed upon the bearings in said stirrup-bars and carrying brake-shoes for engagement with said track-wheels and extending through said apertures, and means for simultaneously actuating said levers to apply said brake-shoes.

5. The combination of a car-truck frame having spaced track-wheels mounted for rotation therein and with a central transverse member, stirrup-bars of inverted-U shape and embracing said central member between said wheels and having pivot-bearings in their depending ends, guide-plates riveted to the upper portions of said stirrup-bars and extending laterally from said central member and with longitudinal apertures in the extended portions, levers fulcrumed upon the bearings in said stirrup-bars and carrying brake-shoes for engagement with said track-wheels and extending through said apertures, brackets riveted to said guard-plates and stirrup-bars and having bearings in their upper ends, a shaft mounted for rotation in said bearings and having rocker-arms upon its ends, rods connecting said rocker-arms with the free ends of said brake-levers, and means for forcibly rotating said shaft to apply said brake-shoes.

6. The combination of a car-truck frame having track-wheels, guide-plates connected transversely of said truck-frame between said wheels and having longitudinal apertures through their ends, levers fulcrumed upon said truck-frame and with their upper ends extending through said apertures, brake-shoes upon the lower ends of said levers and having bearing-surfaces conforming to the treads and embracing the flanges of said track-wheels, and means for simultaneously actuating said levers to apply said brake-shoes.

In testimony that we claim the foregoing as our own we have hereto affixed our signatures in the presence of two witnesses.

HERBERT E. BROWN.
MARCUS L. BROWN.

Witnesses:
G. W. ADAMS,
J. L. FISHER.